United States Patent
Antonucci et al.

(10) Patent No.: US 6,587,545 B1
(45) Date of Patent: Jul. 1, 2003

(54) SYSTEM FOR PROVIDING EXPANDED EMERGENCY SERVICE COMMUNICATION IN A TELECOMMUNICATION NETWORK

(75) Inventors: James T. Antonucci, Wheaton, IL (US); Brian Glen Barnier, Naperville, IL (US); Lawrence W. Ciesla, Yorkville, IL (US); Douglas Craig Kroupa, Lisle, IL (US); Robert Allen Sherry, Aurora, IL (US); Donald Robert Ziemann, Montgomery, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 64 days.

(21) Appl. No.: 09/694,559

(22) Filed: Oct. 23, 2000

Related U.S. Application Data

(60) Provisional application No. 60/186,939, filed on Mar. 4, 2000.

(51) Int. Cl.$^7$ ............................................. H04M 11/00
(52) U.S. Cl. .............................. 379/37; 379/45; 379/49
(58) Field of Search .............................. 379/37, 38, 39, 379/40, 45, 41, 42, 43, 44, 46, 47, 48, 49, 50, 243, 177; 455/404

(56) References Cited

U.S. PATENT DOCUMENTS

| | | | |
|---|---|---|---|
| 4,757,267 A | 7/1988 | Riskin | 379/113 |
| 5,805,670 A | 9/1998 | Pons et al. | 379/45 |
| 6,151,385 A | * 11/2000 | Reich et al. | 379/49 |

* cited by examiner

*Primary Examiner*—Melur Ramakrishnaiah
(74) *Attorney, Agent, or Firm*—Patti & Brill, LLC

(57) ABSTRACT

A system for providing expanded emergency communication in a telecommunication network including an array of switches, junctions, channels, customer-operated communication devices and service providing stations. The network is connected to facilitate communication among stations using a plurality of milieux. Communication is effected among a service providing station, an emergency complex, an emergency answering position, and an expanded service subscriber. The system comprises: (a) a request acquisition subsystem for receiving emergency requests from a requesting caller; (b) an information store for storing information relating to selected callers; (c) a notification facility for notifying selected subscribers; and (d) a dispatch facility for receiving selected of the information relating to an extant emergency. The system effects transfer of information from the information store to the dispatch facility based upon emergency request information relating to the extant emergency. The system notifies subscribers based upon the emergency request relating to the extant emergency. The method comprises the steps of: (a) providing a request acquisition subsystem for receiving emergency requests from a caller; (b) providing an information store for storing information relating to selected callers; (c) providing a notification facility for notifying selected subscribers; (d) providing a dispatch facility for receiving information relating to affected callers; the affected callers being associated with an extant emergency; and (e) effecting transfer of information from the information store to the dispatch facility based upon emergency request information relating to the extant emergency.

8 Claims, 8 Drawing Sheets

SYSTEM FOR PROVIDING EXPANDED EMERGENCY SERVICE COMMUNICATION IN A TELECOMMUNICATION NETWORK

This application claims benefit of prior filed copending Provisional Patent Application Serial No. 60/186,939, filed Mar. 4, 2000.

BACKGROUND OF THE INVENTION

The present invention is directed to telecommunication systems, and especially to telecommunication systems having geographic sensitivity for automatic call connection with receiving stations. The present invention is especially well configured for telecommunication systems dealing with special number telecommunication systems, such as abbreviated number emergency services notification and dispatch operation telecommunication systems. Such emergency services notification and dispatch systems are commonly known as 9-1-1 systems in the United States.

The present invention includes a system and method for enabling any abbreviated number (or other special number) geographically based routing in a manner that is cost effectively applicable to hybrid private/public telecommunication networks such as are found in today's market. Thus, the present invention is advantageous for use by a public telephone service provider (such as an incumbent local exchange company—ILEC), a competitive local exchange carrier (CLEC), an Internet service provider (ISP), a wireless service provider (WSP), a large enterprise customer using a private exchange such as a private branch exchange (PBX), a wireless traffic aggregator/reseller switching between various backbone providers, a satellite telephone service provider or any other telephone service provider that may have users, or customers, employing their service to access a special number service seeking assistance from a geographically proximate locus.

Telecommunication systems sensitive to geographic aspects have been proposed. In U.S. Pat. No. 4,757,267 to Riskin for "Telephone System for Connecting a Customer With a Supplier", issued Jul. 12, 1988, a system is disclosed which contemplates using geographic information gleaned from a caller's telephone number for use with a V-H (vertical-horizontal) data base for ascertaining which site to connect with the caller to ensure geographic proximity between the dealer at the selected site and the caller. The Riskin system depended upon entry of the telephone number information using DTMF (Dual Tone Multi-Frequency) signaling. If a customer entered his phone number using a dial phone, Riskin provided for connecting the caller with a human operator so that the human operator could enter the telephone number information using a DTMF entry device. The V-H data base disclosed by Riskin for use with his system was a complex transformation of latitude and longitude which was used by long distance telephone companies to compute the distance between a caller and a called party in order to assess the charge for a long distance call. Riskin used the V-H coordinate system to refer a caller to a dealer that was determined to be geographically closest to the caller. Riskin also disclosed using the DTMF phone number information to connect a caller with a dealer on a territorial basis to effect "gift routing". According to Riskin's disclosure, a dealer may be connected with a caller based upon the dealer's proximity to an intended gift recipient who was identified by DTMF phone number information relating to the intended recipient.

Riskin's invention provides only a coarse location based upon the caller's telephone number in the format: "NPA-NNX". In that format, "NPA" refers to "Number Plan Area", commonly known as Area Code. "NNX", the next finer number indicator within an Area Code, refers to a Central Office of the phone service provider. As a result, Riskin's invention provides location only to the detail of an area served by a respective Central Office of a service provider. Such an area can often be a very large geographic expanse. Locating a dense population of service locations regarding proximity to a caller is problematic when the location indicator is coarsely defined, as is the case with Riskin's system.

Emergency services notification and dispatch operations, commonly known in the United States as 9-1-1 Service, has its genesis in a 1957 recommendation by the National Association of Fire Chiefs for a single number for reporting fires. In 1967, the President's Commission on Law Enforcement and Administration of Justice recommended that a single number should be established nationwide for reporting emergency situations. The use of different telephone numbers for different types of emergencies was considered to be contrary to the purpose of using a single, universal emergency notification number. Other federal agencies and several government officials supported and encouraged the recommendation. The President's Commission on Civil Disorders charged the Federal Communications Commission (FCC) with finding a solution. In November 1967, the FCC met with the American Telephone and Telegraph Company (AT&T) to establish a universal number that could be implemented quickly. In 1968, AT&T announced the establishment of the number 9-1-1 as the emergency notification number nationwide. The 9-1-1 code was chosen because it was considered to be brief, easily remembered, and could be dialed quickly. It was also a unique number that had never been employed as an office code, area code or service code, and it met long range numbering plans and switching configurations of the telecommunication industry. The 9-1-1 number met the requirements of all parties, in government and in private industry.

Congress supported the AT&T plan and passed legislation allowing use of only the numbers 9-1-1 when creating an emergency calling service. The 9-1-1 number was thus established as a nationwide standard emergency number. The first 9-1-1 call in the United States was completed by Senator Rankin Fite in Haleyville, Ala., using the Alabama Telephone Company. Nome, Ak. Implemented 9-1-1 service in February 1968.

In 1973, The White House Office of Telecommunication issued a policy statement recognizing the benefits of 9-1-1, encouraging the nationwide adoption of 9-1-1, and establishing a Federal Information Center to assist governmental units in planning and implementing 9-1-1 service.

A basic 9-1-1 System provides for programming with special 9-1-1 software a telephone company end office (also known as a "central office" or a "Class 5 office") to route all 9-1-1 calls to a single destination. The single destination was termed a Public Safety Answering Point (PSAP). In such an arrangement, all telephones served by the central office would have their 9-1-1 calls completed to the PSAP. However, the areas served by respective telephone company central offices do not line up with the political jurisdictions that determine the boundaries for which PSAP may be responsible. That is, a municipal fire department or police department may geographically include an area outside the area served by the central office, a condition known as underlap. Likewise, the municipal fire or police department may encompass an area of responsibility that is less expansive than the area served by the central office, a situation known as overlap. Further, the original basic 9-1-1 systems did not provide any identification of the caller; the PSAP human operator had to obtain such information verbally over the line after the call was connected. The major shortcoming of the basic 9-1-1 systems was that they could not support interconnection to other telecommunication providers such as independent telephone service companies, alternate local exchange carriers (ALECs), or wireless carriers. The "basic" nature of the basic 9-1-1 system also indicates that the system does not have Automatic Location Identification (ALI) capability or Automatic Number Identification (ANI) capability with a call back capability.

Similar abbreviated number systems are in place for handling emergency service calls in countries other than the United States. The abbreviated number system established in Canada is the foreign system most similar to the system established in the United States. There are other abbreviated number calling systems in place in the United States and abroad for such purposes as handling municipal information and services calls (3-1-1) and for other purposes. All of these special, or abbreviated number call systems that have geographic-based content suffer from similar shortcomings in their abilities to automatically place incoming calls to an action-response facility geographically proximate to the locus of the caller. It is for this reason that the 9-1-1 emergency call system of the United States is employed for purposes of this application as a preferred embodiment of the system and method of the present invention.

Automatic Number Identification (ANI) is a feature for 9-1-1 services that allows the caller's telephone number to be delivered with the call and displayed at the PSAP. This ANI feature is sometimes referred to as Calling Party Number (CPN). The feature is useful for identifying the caller and, if the caller cannot communicate, for callback. A signaling scheme known as Centralized Automatic Message Accounting (CAMA), originally used to identify the originator of a long distance call for billing purposes, was adapted to facilitate ANI delivery to the PSAP. CAMA uses multi-frequency (MF) signaling to deliver 8 digits to the PSAP. The first digit (called the Number Plan Digit-NPD) specifies one of four possible area codes. Digits 2–8 represent the caller's 7-digit telephone number. The ANI is framed with a key pulse (KP) at the beginning and a start (ST) at the end in the format: KP-NPD-NXX-XXXX-ST.

The multi-frequency (MF) signaling used in connection with the ANI feature is not the same as the Dual Tone Multi-Frequency (DTMF) signaling also encountered in telecommunication systems. Both signaling schemes use a combination of two specific tones to represent a character, or digit, but the tones are different. There are 16 DTMF tones (0–9, #, *, A, B, C, D); there are a greater number of MF tones (including 0–9, KP, ST, ST', ST", and others). DTMF tones represent signals from a user to a network; MF tones are control signals within the network. An enhanced MF arrangement has recently been used in connection with 10-digit wireless telephone systems.

The availability of the caller's telephone number to the PSAP (the ANI feature) led quickly to providing the caller's name and address as well. This was straightforwardly accomplished using the subscriber information stored by telephone companies based upon telephone number since the 1980's. New equipment at the PSAP enabled queries of an Automatic Location Identification (ALI) data base using the caller's number provided by the ANI feature to ascertain name and address information. The ALI databases are typically maintained by the respective telephone company serving the PSAP. This was an improvement, but a problem still remained where several telephone company central offices served a town or county. Other problems also developed with the growing volume of mobile callers using wireless phones, satellite phones and communications over the Internet. Information regarding the locus of the origin of the call merely identified the locus where the call entered the wireline network; even such limited location information is not always provided. No indication was presented to identify the geographic location of such mobile callers.

As the situation of multiple central offices serving a PSAP occurred more frequently, it was clear that it was inefficient to build communication trunks from several central offices to a PSAP. As a result the 9-1-1 Tandem was developed. With that equipment, trunks from central offices are concentrated at a tandem office (a 9-1-1 Tandem) from which a single trunk group serves a given PSAP. Often a 9-1-1 tandem comprises an otherwise common Class 5 telephone system end office (EO), with added software to configure it for 9-1-1 operations. Such concentration of trunks reduces size and cost of PSAP equipment. The tandem is a telephone company switch that provides an intermediate concentration and switching point. Tandems are used for many purposes, including intra-LATA (Local Access and Transport Area) toll calls, access to other local exchange carriers (LECs), and access to long distance carriers and telephone operators.

A significant development in 9-1-1 services has been the introduction of Enhanced 9-1-1 (E9-1-1). Some of the features of E9-1-1 include Selective Routing, ANI, ALI, Selective Transfer and Fixed Transfer. Selective Transfer enables one-button transfer capability to Police, Fire and EMS (Emergency Medical Service) agencies appropriate for the caller's location listed on the ALI display. Fixed Transfer is analogous to speed dialing.

Selective Routing is a process by which 9-1-1 calls are delivered to a specific PSAP based upon the street address of the caller. Selective Routing Tandems do not directly use address information from the ALI database to execute decisions regarding which PSAP to connect. Recall that emergency services (Police, Fire and EMS) are typically delivered on a municipality basis. Often there will be one Police Department (e.g., municipal, county or state), but there may be several Fire Departments and EMS Agencies. The town will be divided into response areas served by each respective agency. The response areas are overlaid and may be defined as geographic zones served by one particular combination of Police, Fire and EMS agencies. Such zones are referred to as Emergency Service Zones (ESZ). Each ESZ contains the street addresses served by each type of responder. The ESZs are each assigned an identification number (usually 3–5 digits), known as Emergency Service numbers (ESN).

The Assignment of ESZs and corresponding ESNs enables the compilation of selective routing tables. The street addresses are derived from a Master Street Address Guide (MSAG), a data base of street names and house number ranges within associated communities defining Emergency Service Zones (ESZs) and their associated Emergency Service Numbers (ESNs). This MSAG enables proper routing of 9-1-1 calls by the 9-1-1 tandem; this is Selective Routing as implemented in a 9-1-1 system. Thus, the telephone company must have an MSAG valid address to be assigned the appropriate ESN for selective routing purposes and that information must be added to the 9-1-1 ALI database. It is by using such information that the selective routing capability of the Selective Routing Tandem can properly route a 9-1-1 call to the correct PSAP. If the information is not available in the ALI database, the record is placed into an error file for further manual handling.

A portion of the ALI database may be loaded into a Selective Routing Data Base (SRDB) for use by the 9-1-1 Tandem. The SRDB may be located in the Tandem, in an adjunct processor, or in the ALI database.

Reliability is a very important factor considered in designing 9-1-1 systems. One approach to providing reliability is to provide diversely routed trunk groups from each central office to its respective 9-1-1 Tandem. Preferably, each trunk group is large enough to carry the entire 9-1-1 traffic load for the respective central office. However, some systems are designed with less than full traffic capacity on trunk groups to "choke" or "congestion manage" incoming calls to a tandem in order to avoid overloading a PSAP. In some arrangements, parallel 9-1-1 Tandems are provided so that a central office has capable 9-1-1 Tandem ready for use (albeit with 50% call handling capacity) without interruption if one of the 9-1-1 Tandems fails. Switched bypass to an alternate 9-1-1 Tandem, commonly using digital crossover switches, is another approach to providing reliability in 9-1-1 systems.

Another approach to providing redundancy and robustness for a 9-1-1 system is the employment of Instant Network Backup (INB). Using INB, if a call does not complete to the 9-1-1 network for any reason (e.g., trunk failure, facility problem, 9-1-1 Tandem failure or port failure), the INB takes over and completes the call to a predesignated 7- or 10-digit number. Using this INB alternate path, ANI and ALI information are not delivered, but the call is completed to a local public safety agency, usually the local PSAP.

The interface between Operator handled calls and a 9-1-1 system is addressed in several ways. One system provides a direct connection between an Operator Tandem and the 9-1-1 Tandem. The operator forwards the call with the caller's ANI to the 9-1-1 Tandem. The 9-1-1 Tandem treats the call as though the caller had dialed the call. A second way to effect the desired interface is by using pseudo numbers. A pseudo number is a number that, when dialed, will reach a specific PSAP as a 9-1-1 call. Pseudo numbers have some special ALI information associated with them; for example, there may be a pseudo number associated with each municipality in a state. Dialing the pseudo number, usually from outside the LATA (Local Access and Transport Area), will generate a 9-1-1 to the PSAP for that municipality. The ALI display will indicate that it is a third party conference call from an unknown address in that town. The caller is not identified, but the call goes to the PSAP where the caller is believed, or claims, to be. Pseudo numbers are useful for Alternate Local Exchange Carrier (ALEC) or Competitive Local Exchange Carrier (CLEC) operators who may be located anywhere in the country.

A third method for effecting an interface for operator handled calls with a 9-1-1 system is through the public switched telephone network (PSTN), dialing the directory number for the PSAP. This is often referred to as the "back door" number by ALEC and CLEC operators.

The same issues encountered in implementing a 9-1-1 system for identifying user location are also extant in other telecommunication systems where user location (or other locations) are important. As mentioned above in connection with the Riskin '267 Patent, marketing decisions, dealer contact actions and delivery actions may be more informedly effected using location information obtainable from a properly featured telecommunication system. According to Riskin, such geographic location information is of value even when it is coarse information suitable only for locating a caller within a telephone service provider central office service area.

The advent of wireless communications has further exacerbated the difficulty of ascertaining caller location in telecommunication systems. The "patchwork" solutions described above regarding 9-1-1 systems have been mirrored in other special, or abbreviated number systems to a significant extent. The "patchwork" solutions have created a capability-limited telecommunication system that cannot ascertain geographic information as fully or as easily as it should for all types of callers. This capability limitation has been especially felt in connection with wireless telephone systems. The system is overly dependent upon human intervention to properly route calls to appropriate receivers, such as a proper PSAP. New modes of communication, such as Voice Over IP (Internet Protocol), further contribute to telecommunication traffic not identifiable regarding geographic origin using present telecommunication routing systems.

Similar limitations will likely occur in other abbreviated number, or other special number, telephone systems handling location-based calls with resulting adverse limitations. Other such abbreviated number systems include emergency call systems in countries other than the United States, abbreviated number calling systems for reaching telephone maintenance services, abbreviated number calling systems for municipal information and services, and similar systems.

There is a need for an improved telecommunication system and method with geographic sensitivity that can be employed for abbreviated number systems and other telephone systems to ascertain user location or other geographic information with less human intervention than is presently required.

There is also a need for an improved telecommunication system and method with geographic sensitivity that can be employed for abbreviated number systems and other telephone systems to ascertain user location or other geographic information when involving wireless, Internet, satellite or other non-geographically fixed communication technologies.

SUMMARY OF THE INVENTION

A system for providing expanded emergency service communication in a telecommunication network is disclosed. The telecommunication network includes an array of switches, junctions, communication channels, user-operated communication devices and telecommunication service providing stations. The telecommunication network is connected to facilitate electronic communication among a plurality of stations using a plurality of communication milieux. Communication is effected among at least one telecommunication service providing station, at least one emergency service complex, at least one emergency service answering position, and at least one expanded service subscriber. The system comprises: (a) a service request acquisition subsystem for receiving emergency service requests from a requesting caller via at least one of the customer-operated communication devices; (b) an information store for storing pertinent information relating to selected the requesting callers; (c) a notification facility for storing information relating to arrangements for notifying selected expanded service subscribers pursuant to predetermined criteria; the pertinent information includes at least some of the predetermined criteria; and (d) a dispatch facility for receiving at least some selected information of the pertinent information relating to affected requesting callers associated with an extant emergency service request. The service request acquisition subsystem, the information store, the notification facility and the dispatch facility are distributed among the telecommunication network. The system effects transfer of at least some selected information from the information store to the dispatch facility based upon emergency request information acquired by the acquisition subsystem relating to the extant emergency service request. The system effects notification of selected expanded service subscribers based upon the emergency request information relating to the extant emergency service request. The method of the present invention comprises the steps of: (a) providing, in no particular order: (1) a service request acquisition subsystem for receiving emergency service requests from a requesting caller via at least one of the user-operated communication devices; (2) an information store for storing pertinent information relating to selected the requesting callers; (3) a notification facility for storing information relating to arrangements for notifying selected expanded service subscribers pursuant to predetermined criteria; the pertinent information including at least some of the predetermined criteria; and (4) a dispatch facility for receiving at least some selected information of the pertinent information relating to affected the requesting callers; the affected requesting callers being associated with an extant the emergency service request; and (b) effecting transfer of at least some selected information from the information store to the dispatch facility based upon emergency request information acquired by the acquisition subsystem relating to the extant emergency service request. The method may comprise the further step of: (c) effecting notification of selected expanded service subscribers of the at least one expanded service subscriber based upon the emergency request information relating to the extant emergency service request.

Prior art special number, or abbreviated number telecommunication systems receive some geographic related information. In some presently existing situations, mostly involving wireline telephone connections, geographic information received is adequate to accomplish required routing. In other presently existing situations, such as in situations requiring rerouting of calls to wireless service providers (WSP), to private branch exchanges (PBX), to overcome a problem in the normal wireline connection, or for other special situations, required call routing is difficult. The degree of difficulty varies depending upon whether adequate arrangements were made beforehand between respective PSAPs. In such difficult rerouting situations, human operators at special number answering stations must effect connection with geographically appropriate special number action stations in order that appropriate action agencies geographically proximate to the caller initiating the special number call may be responsively employed. In some systems the human operator effects the required routing by pressing a button, or a plurality of buttons. However, in order to ascertain the desired destination of the call, the human operator must read a screen or consult a list or directory. Such consulting to ascertain desired routing decisions consume time and offer opportunities for human errors.

There is a need for an automatic-connection capability for effecting the desired geographically proximate call completion with little or no human operator intervention required. Automatic routing based upon geographic information provided with call information is known for generalized telephone network systems. There is a need for employing the advantages proven to be attainable by today's generalized telephone network systems technology to the 1960's and 1970's "patchwork" system structure presently employed for special number communication systems in the United States.

The special number handling and routing system of the present invention offers numerous advantages over present special number systems. The present invention contemplates adding special number handling capabilities to a telecommunication network switch, such as selective routing, enhanced Automatic Location Identification (ALI), mapping, and other capabilities peculiarly applicable to special, or abbreviated number call handling. Such added capabilities at the special number system network switch level provide significant flexibility to handling of special number calls by a telecommunication system. For example, such integration of special number call handling capability in a telephone network obviates the need for choking through overflow routing, queuing, interactive voice response (IVR) or granular plotting of calls for filtering. The new system of the present invention minimizes the difficulty in coordinating choking across a variety of Local Exchange Carriers (LECs) that may route calls to a 9-1-1 tandem. The new system provides each carrier (LEC) with an appropriately engineered network access to manage call volume and distribute calls to call takers in special call answering stations, such as Public Safety Answering Positions (PSAPs), or route the calls to queues or IVRs, according to extant service policies.

Another important capability provided by the system of the present invention is an ability to manage multiple special number answering stations (such as PSAPs) for disaster recovery, mutual aid, or other cooperative activities. The system of the present invention facilitates sharing of data screens, call screens, dispatch screens and other commonalities that may be instituted when needed without necessarily requiring voice connection. The system of the present invention also creates a more robust system better able to resist interruption during disaster operations. Integrating special number handling systems with a telecommunication system at the special number system network switch level provides significantly greater flexibility and speed in traffic rerouting to avoid network breaks, and similar disaster-related problems.

Also of significance, such high-level integration of special number handling systems with public telecommunication systems makes it more likely that improvements and advances in communication technology will be employed for upgrading special number handling in the future. If special number handling systems are not "main stream" applications integrated within the public phone system, there may be a tendency for them to evolve differently than the public telephone system, and future compatibility between systems would be ever more difficult.

Further, high level integration of special number call handling capabilities within the main stream public telephone network facilitates easier inclusion of diverse special call handling agencies within the system, such as colleges, animal control agencies, poison control agencies and others.

By way of example, from a public safety perspective, two significant improvements provided by the system of the present invention are (1) interconnected PSAPs with click-through routing enabling that treats all PSAPs as one large logical PSAP across political jurisdictions and carrier service providers' boundaries; and (2) a significantly more reliable network with added redundancy, ability for calls to overflow and be backed up (e.g., eliminating choking) and enhanced network management capabilities using the latest technologies. These advantages are realized because the system of the present invention employs 9-1-1-tandems interconnected with all other 9-1-1 tandems and network switches at high level interfaces enabling more varied data types at faster speeds in the public telephone network. In its preferred embodiment, a 9-1-1 tandem configured according to the present invention is a stand-alone switch apparatus.

It is, therefore, an object of the present invention to provide a telecommunication system and method for handling special, or abbreviated number calls that has geographic sensitivity.

It is a further object of the present invention to provide a telecommunication system and method for handling special, or abbreviated number calls that can automatically connect a caller with a geographically proximate action agency with no human intervention using geographic information included with call information.

Further objects and features of the present invention will be apparent from the following specification and claims when considered in connection with the accompanying drawings, in A which like elements are labeled using like reference numerals in the various figures, illustrating the preferred embodiments of the invention.

DETAILED DESCRIPTION OF THE PREFERRED EMBODIMENT

Figure 1:
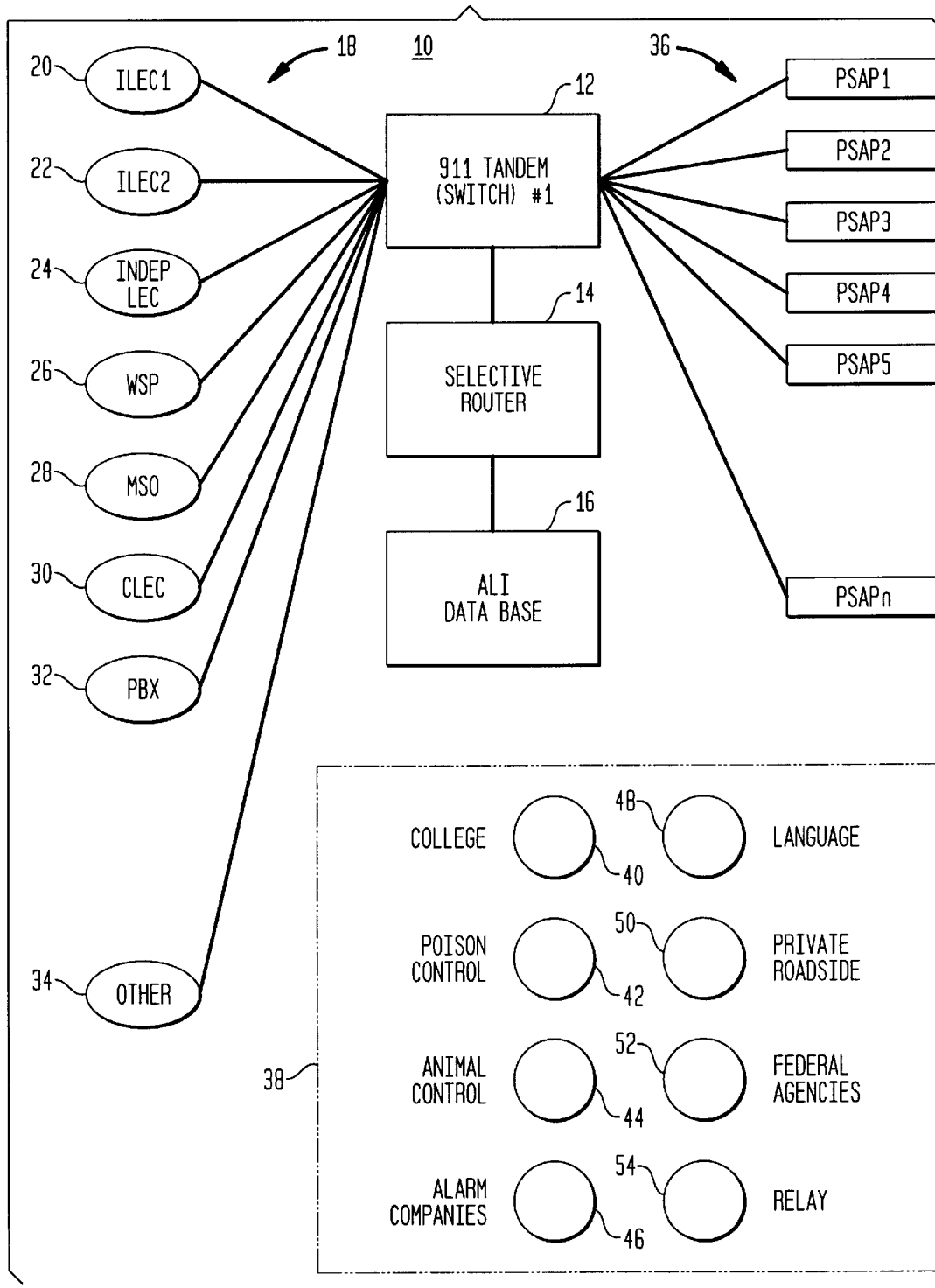
FIG. 1 is a block diagram illustrating selected elements of a prior art abbreviated number telecommunication system manifested in a 9-1-1 system.

FIG. 1 is a block diagram illustrating selected elements of a prior art abbreviated number telecommunication system, manifested in a 9-1-1 system. In FIG. 1, a prior art 9-1-1 telecommunication system 10 includes a 9-1-1 tandem 12 connected with a selective router 14 and an ALI database 16. A plurality of service providers 18 are connected with 9-1-1 tandem 12. Service providers 18 are illustrated in FIG. 1 as representatively including an incumbent local exchange carrier #1 (ILEC1) 20, an incumbent local exchange carrier #2 (ILEC2) 22, an independent local exchange carrier (IndepLEC) 24, a wireless service provider (WSP) 26, a multi-services operator (MSO) 28, a competitive local exchange carrier (CLEC) 30, and a private branch exchange (PBX) 32. Service providers 18 may also include other entities, as represented by a service provider "OTHER" 34 in FIG. 1. Service providers 18 provide telecommunication services to users (not shown in FIG. 1) including, as one communication service, a connection with a 9-1-1 emergency call service. System 10 is representative of a prior art 9-1-1 system in a large metropolitan area having several political jurisdictions. Thus, 9-1-1 tandem 12 serves a plurality of public safety answering positions (PSAPs) 36, such as PSAP1, PSAP2, PSAP3, PSAP4, PSAP5, and PSAPn. The term "PSAP" may also be used to refer to "public safety answering points".

Other emergency call entities 38 are illustrated in FIG. 1 as not connected with 9-1-1 tandem 12. Such entities are typically not included within a 9-1-1 system, yet often may find it advantageous to employ a system such as 9-1-1 system 10. Other entities 38 are representatively (yet, not exhaustively) illustrated in FIG. 1 as including college campuses 40, poison control centers 42, animal control agencies 44, private alarm companies 46, language translation providers 48, private roadside assistance agencies 50, federal agencies 52 and relay entities 54.

The architecture of prior art 9-1-1 system 10 is centralized primarily around incumbent local exchange carriers (ILECs), such as ILEC1 20 and ILEC2 22, and secondarily around political jurisdictions (not shown in FIG. 1). There are some cooperative agreements in effect, but they are another aspect of the "patchwork" nature of the prior art 9-1-1 systems represented by FIG. 1. The result is that prior art 9-1-1 systems, such as 9-1-1 system 10, are compartmentalized in structure, and cross-jurisdictional cooperation is not easily effected unless a group of jurisdictions—e.g., municipalities within a county—arrange to "hard wire" the connections necessary to accomplish cooperative structure. Sometimes a group of related PSAPs may make other special arrangements with a LEC (Local Exchange Carrier). Interconnection between carriers (i.e., service providers 18 in FIG. 1) or between wireline carriers and wireless carriers are cumbersome. One result is that such ad hoc cooperative system arrangements too often result in a fragile system susceptible to service interruption during disaster situations. It is in such disaster situations that such emergency service systems will be needed most, yet such systems are presently configured in manners lacking robust redundant and diverse route paths to existing 9-1-1 tandems from the service provider offices (e.g., service providers 18 in FIG. 1), or from PSAPs 36 (FIG. 1).

Also of significant importance is the lack of connectivity between other entities 38 and 9-1-1 tandem 12 in prior art system 10. Such a lack of connectivity means that other entities 38 effect connection with a PSAP 36 via the public switched telephone network (PSTN), not shown in FIG. 1, like any other call made between subscribers.

Another significant shortcoming of prior art 9-1-1 system 10 is difficulty in rerouting of calls to an appropriate PSAP 36 geographically proximate to a caller when a PSAP receives a misrouted 9-1-1 call, that is the caller is located not in an area served by the receiving PSAP 36. If a caller reveals his location to a human operator located within system 10 (most likely in association with operation of 9-1-1 tandem 12), the human operator can manually reroute the call to connect the call to a PSAP 36 most proximate to the caller's location. Selective router 14 identifies which PSAP is appropriate for handling a particular emergency based upon location information regarding the caller. Using information from selective router 14, a human operator may effect connection with the indicated appropriate PSAP; selective router 14 does not have a straightforward robust rerouting capability as is contemplated by the present invention. Selective router 14 may present a display on a screen to a human operator for selecting an appropriate PSAP for the call being considered. The human operator selects a PSAP from the display on the screen and presses a button to complete the call. In essence, the call completion is effected as a conference call. Such a call destination selection and completion arrangement is fraught with opportunities for human error, and ties up communication resources unnecessarily.

ALI database 16 is just that—a data base. ALI database 16 cooperates with selective router 14 to facilitate the identification of an appropriate PSAP by selective router 14. However, no straightforward robust rerouting of calls to PSAPs proximate to a caller's locus is effected using ALI data base 16, selective router 14, or any combination of those devices.

Figure 2:
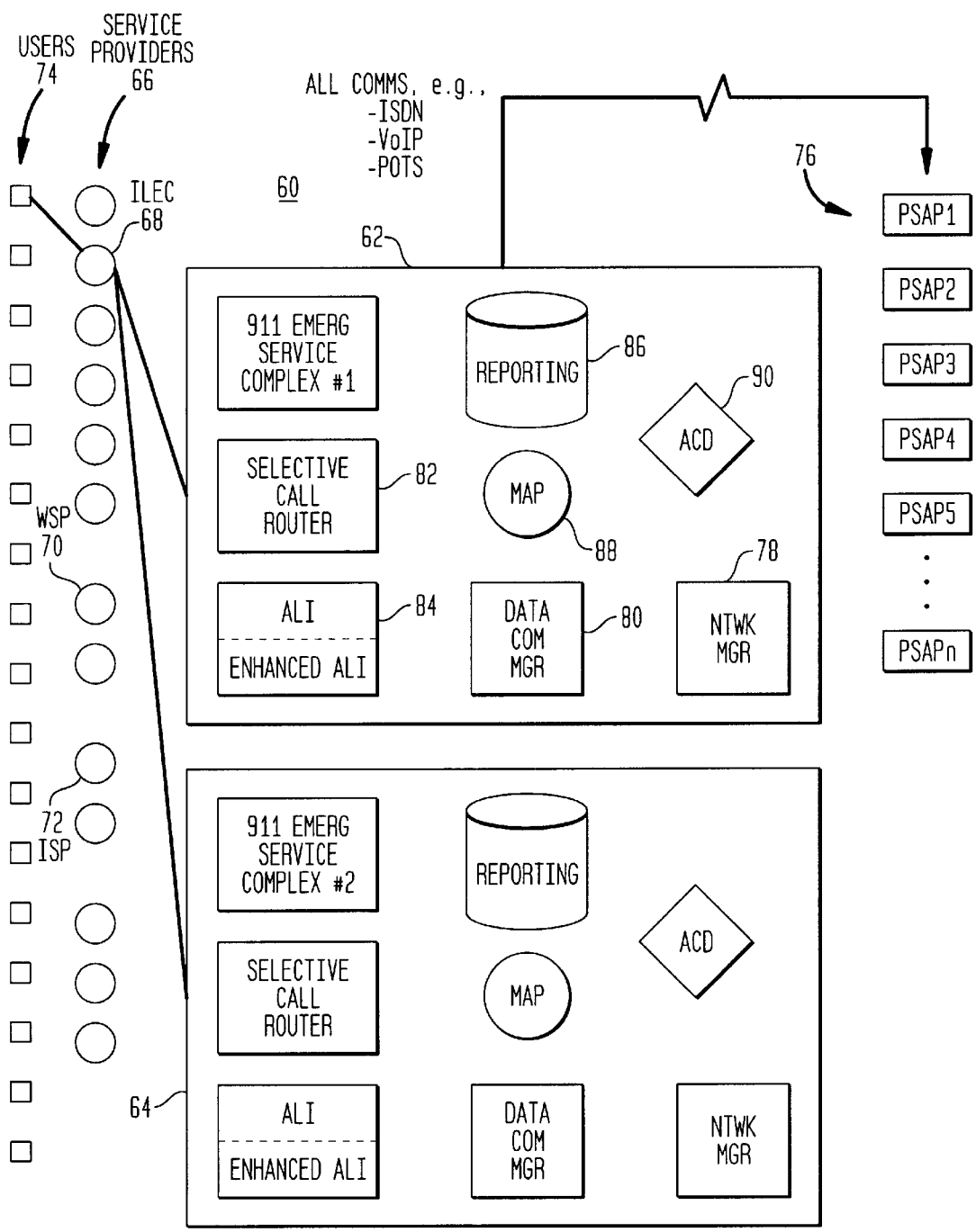
FIG. 2 is a block diagram illustrating selected elements of the preferred embodiment of the abbreviated number telecommunication system of the present invention, manifested in a 9-1-1 system.

FIG. 2 is a block diagram illustrating selected elements of the preferred embodiment of the abbreviated number telecommunication system of the present invention, manifested in a 9-1-1 system. In FIG. 2, an improved 9-1-1 system 60 includes a first emergency service complex (ESC1) 62 and a second emergency service complex (ESC2) 64. Preferably emergency service complexes ESC1 62 and ESC2 64 are substantially the same in structure and are arranged for parallel backup operational support for users of improved system 60. In order to simplify explanation of improved system 60, this description will focus upon connections and arrangements involving emergency service complex ESC1 62, with the understanding that parallel connections and arrangements are in place regarding emergency service complex ESC2 64.

Emergency service complex ESC1 62 serves a plurality of service providers 66. As will be appreciated in greater detail in connection with FIG. 4, emergency service complex ESC1 62 is connected via a public telecommunication network (not shown in FIG. 2) with a significantly wider range of service providers 66 than were served by prior art 9-1-1 system 10 (FIG. 1). Thus, emergency service complex ESC1 62 serves service providers 66 including an incumbent local exchange carrier (ILEC) 68, a wireless service provider (WSP) 70, an Internet service provider (ISP) 72, and other service providers 66 not specifically identified in FIG. 2. In fact, emergency service complex ESC1 62 may be connected via a public network, such as a public switched telephone network (PSTN) (not shown in FIG. 2) with any of the service providers 18 (FIG. 1), with any or all of the other entities 38 (FIG. 1), and with additional service providers not even contemplated for connection with prior art 9-1-1 system 10. Such additional service providers may include, by way of example, Internet service provider ISP 72 (FIG. 2).

Service providers 66 provide telecommunication services of various milieux to callers, or users 74. The various telecommunication milieux contemplated by system 60 of the present invention includes any electronic transmission of information including, for example, voice, data and video communications, whether delivered via systems employing digital, analog, ISDN, optical, wireline, wireless, or other delivery technologies. Also included within the contemplated technological applicability of the present invention are voice, data or video signals delivered over the Internet, via satellite communications, or via other delivery media.

A similarly broad array of communication milieux are also available to connect emergency service complex ESC1 62 with a plurality of public safety answering positions (PSAPs) 76, such as PSAP1, PSAP2, PSAP3, PSAP4, PSAP5, PSAP6, and PSAPn. Similar parallel communication capability is also available between emergency service complex ESC2 64 and service providers 66 and PSAPs 76. The connections relating to emergency service complex ESC2 64 are not fully displayed in FIG. 2 in order to keep the drawing simple for purposes of explaining the present invention.

Emergency service complex ESC1 62 is configured much like a digital switching node in a public telecommunication network to include a network manager device 78 and a data communication manager device 80. Improved system 60 further includes a selective call router 82 and an ALI/enhanced ALI data base 84. Network manager device 78, data communication manager device 80 and selective call router 82 cooperate to effect location-based call routing, monitor system maintenance needs and carry out other administrative functions. ALI/enhanced ALI data base 84 is substantially similar to such data bases used in present enhanced 9-1-1 systems, and provides additional information relating to callers using the 9-1-1 system, such as special medical needs, handicaps, medication needs and similar information that can be provided by subscribers, or callers, for use in case of an emergency.

Preferably emergency service complex ESC1 62 also includes a reporting data base and utility 86 for ascertaining certain operational characteristics regarding emergency service complex ESC1 62 and improved system 60. For example, reporting data base and utility 86 may be configured to allow managers of improved system 60 to determine how many calls are not reaching an appropriate PSAP 76 within a prescribed time, whether changes in routing criteria might be useful in balancing loads on PSAPs 76, and similar information.

A preferred embodiment of emergency service complex ESC1 62 further includes a mapping capability 88 capable of interpreting geographical information received relating to callers and displaying an indication of such geographic information on a map at emergency service complex ESC1 62, selected PSAPs 76 or elsewhere as an aid to human operators or others. A preferred embodiment of emergency service complex ESC1 62 also includes an automatic call distributor (ACD) 90. ACD 90 effects routing of calls to appropriate PSAPs 76 based upon information provided by selective call router 82. It must be emphasized here that selective call router 14 of prior art system 10 (FIG. 1) relates only street address information with PSAPs, and is not configured for or capable of comprehensive global geographic location determination as is contemplated with the present invention. The configuration of emergency service complex ESC1 62 with a telecommunication switch capability appropriate for operation within a PSTN (including virtual private networks, private networks and other limited access network configurations) as a "full participant" station operating as a telecommunication system node, as contemplated by the present invention, means that selective router 82 of improved system 60 may identify and effect routing to any PSAP reachable by the PSTN.

The present invention contemplates improved system 60 being configured for full participation in a global telecommunication network (not shown in FIG. 2) as a substantially fully cognizant telecommunication switching capability. As a consequence of the fully capable network configuration of the present invention, improved system 60 can receive calls from any user connected with a global telecommunication network through service providers connected to the global network. Thus, geographic information relating to callers' loci will be received relating to a plurality of communication milieux: plain old telephone system (POTS), wireless telephones, satellite telephones, Internet connections, and data delivered by any of those conveyances. Being connected with the global network as a fully capable entity, improved system 60 may interpret geographic information received relating to callers' loci on a global basis. Further, because of the global access available to improved system 60 via the global network, connection to PSAPs may be effected worldwide depending upon the geographic information received.

Thus, for example, a caller located in Arizona placing an emergency service call to a private roadside assistance agency situated in Michigan may be serviced by a local action agency (e.g., police, fire, emergency medical service or towing company) because the Michigan roadside assistance agency routed the call to a Michigan emergency service complex (ESC) along with geographic information embedded in call set up data identifying the caller's location in Arizona. The ESC in Michigan can recognize the geographic relevance of the embedded information to route the call (via the global network through its network manager capability) to the appropriate PSAP most proximate to the caller's locus in Arizona.

Such geographic information may indicate location of a switch or service provider (e.g., ILEC, ALEC, WSP) handling the abbreviated number call. The geographic information may be derived from Global Positioning System (GPS) information, or triangulated information from a plurality of wireless service towers to estimate position of a wireless caller. Another type of geographic information may relate to the Internet service provider access point used by the caller to send a message, or any other geographic information appropriate to estimate the locus of the caller placing the abbreviated number call.

The present invention also contemplates that an emergency service complex, such as emergency service complex ESC1 62 (FIG. 2) will have an Internet connected capability. Using such a capability, for example, an operator at emergency service complex ESC1 62 could click on an appropriate button on a tool bar display on a computer screen to effect desired connections, including Internet communications connections. One embodiment of this novel capability is to establish an emergency services "chat window" to facilitate exchange of information between an operator associated with ESC1 62 and a caller accessing the emergency service system via the Internet.

Figure 3:
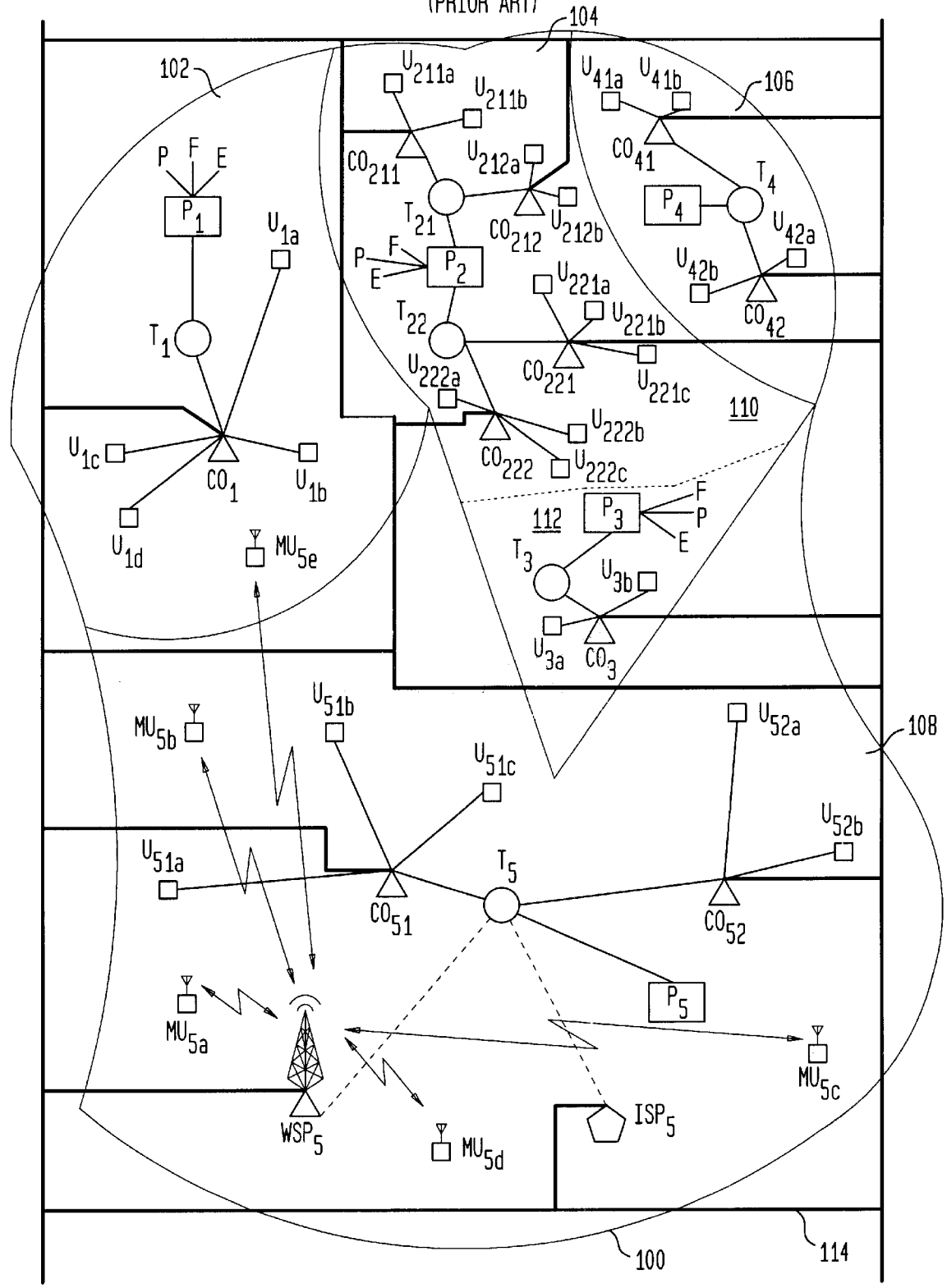
FIG. 3 is a schematic diagram illustrating a prior art employment of an abbreviated number system in a telecommunication network, manifested in a 9-1-1 system.

FIG. 3 is a schematic diagram illustrating a prior art employment of an abbreviated number system in a telecommunication network, manifested in a 9-1-1 system. In FIG. 3, a "country" 100 includes "states" 102, 104, 106, 108. State 104 includes two "counties" 110, 112. Country 100 is served by a telecommunication network 114.

State 102 has an emergency service tandem $T_1$. Tandem $T_1$ is connected with public safety answering position (PSAP) $P_1$; PSAP $P_1$ has communication links with local police (P), fire (F) and emergency medical (E) agencies. Tandem $T_1$ is also connected with central office $CO_1$, the local telephonic service provider for state 102. Central office $CO_1$ supports and is connected with wireline users $U_{1a}$, $U_{1b}$, $U_{1c}$, $U_{1d}$. Central office $CO_1$ is connected with network 114.

State 104 has two counties 110, 112. County 110 has two emergency service tandems $T_{21}$, $T_{22}$, both of which tandems $T_{21}$, $T_{22}$ are connected with a PSAP $P_2$; PSAP $P_2$ has communication links with local police (P), fire (F) and emergency medical (E) agencies. Tandem $T_{21}$ is connected with central offices $CO_{211}$, $CO_{212}$. Central office $CO_{211}$ supports and is connected with wireline users $U_{211a}$, $U_{211b}$. Central Office $CO_{212}$ supports and is connected with wireline users $U_{212a}$, $U_{212b}$. Central offices $CO_{211}$, $CO_{212}$ are each connected with network 114. Tandem $T_{22}$ is connected with central offices $CO_{221}$, $CO_{222}$. Central office $CO_{221}$ supports and is connected with wireline users $U_{221a}$, $U_{221b}$, $U_{221c}$ Central Office $CO_{222}$ supports and is connected with wireline users $U_{222a}$, $U_{222b}$, $U_{222c}$. Central offices $CO_{221}$, $CO_{222}$ are each connected with network 114. County 112 has an emergency service tandem $T_3$ connected with a PSAP $P_3$. Tandem $T_3$ is connected with a central office $CO_3$. Central office $CO_3$ supports and is connected with wireline users $U_{3a}$, $U_{3b}$. Central office $CO_3$ is connected with network 114.

State 106 has an emergency service tandem $T_4$. Tandem $T_4$ is connected with public safety answering position (PSAP) $P_4$; PSAP $P_4$ has communication links with local police (P), fire (F) and emergency medical (E) agencies (not shown in FIG. 3). Tandem $T_4$ is also connected with central offices $CO_{41}$, $CO_{42}$. Central office $CO_{41}$ supports and is connected with wireline users $U_{41a}$, $U_{41b}$. Central office $CO_{42}$ supports and is connected with wireline users $U_{42a}$, $U_{42b}$. Central offices $CO_{41}$, $CO_{42}$ are connected with network 114.

State 108 has an emergency service tandem $T_5$. Tandem $T_5$ is connected with public safety answering position (PSAP) $P_5$; PSAP $P_5$ has communication links with local police (P), fire (F) and emergency medical (E) agencies (not shown in FIG. 3). Tandem $T_5$ is also connected with central offices $CO_{51}$, $CO_{52}$. Central office $CO_{51}$ supports and is connected with wireline users $U_{51a}$, $U_{51b}$, $U_{51c}$. Central office $CO_{52}$ supports and is connected with wireline users $U_{52a}$, $U_{52b}$. Tandem $T_5$ may also be connected with wireless service provider (WSP) $WSP_5$ and Internet service provider (ISP) $ISP_5$. The dotted lines connecting $WSP_5$ and $ISP_5$ with tandem $T_5$ are intended to indicate that such a direct connection is not always established; wireless service providers and Internet service providers often communicate with 9-1-1 systems only via the PSTN. In FIG. 3, wireless service provider $WSP_5$ supports mobile users $MU_{5a}$, $MU_{5b}$, $MU_{5c}$, $MU_{5d}$, $MU_{5e}$. Internet service provider $ISP_5$ supports Internet users (not shown in FIG. 3). Central offices $CO_{51}$, $CO_{52}$ are connected with network 114.

It is important to note in connection with the prior art arrangement illustrated in FIG. 3 the lack of direct connection between any tandem $T_1$, $T_{21}$, $T_{22}$, $T_3$, $T_4$, $T_5$ with network 114. Thus, the only connection of any tandem with network 114 is via a respective central office.

Figure 4:
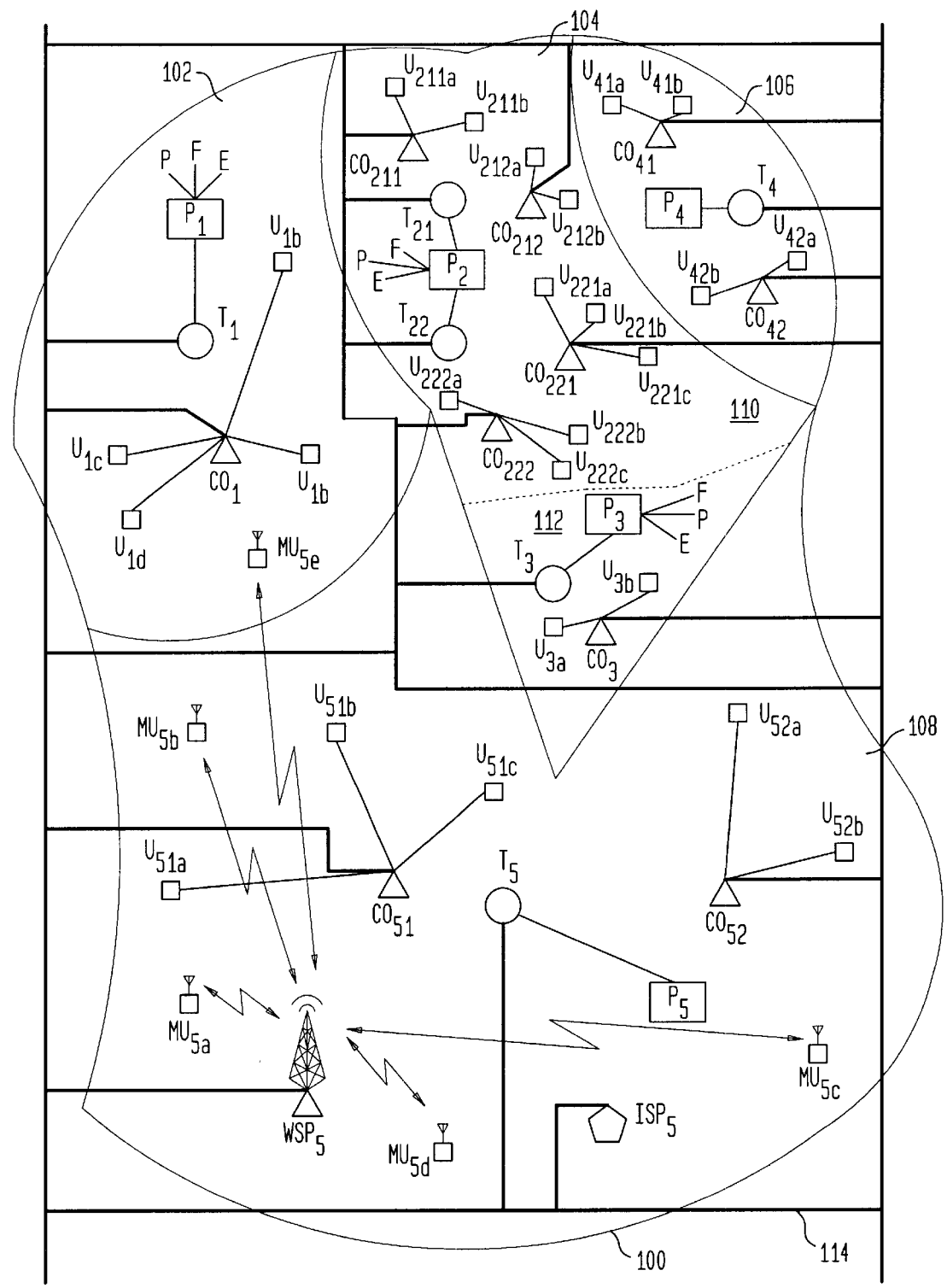
FIG. 4 is a schematic diagram illustrating employment of an abbreviated number system in a telecommunication network, manifested in a 9-1-1 system, according to the present invention.

FIG. 4 is a schematic diagram illustrating employment of an abbreviated number system in a telecommunication network, manifested in a 9-1-1 system, according to the present invention. In the interest of avoiding prolixity and keeping the explanation of the present invention straightforward and simple, a detailed description of FIG. 4 repeating aspects of FIG. 4 that are the same as were illustrated in FIG. 3 will not be undertaken. The tandems, central offices, users, wireless service provider and Internet service provider are all in the same locations and labeled using the same terminology in FIG. 4 as they are in FIG. 3. An important difference in FIG. 4 is that all connections between a tandem and a central office, a wireless service provider, or an Internet service provider have been removed. Also, each tandem is directly connected with network 114. Thus, in state 102, tandem $T_1$ remains connected with PSAP $P_1$, but is not connected with central office $CO_1$. In state 104, Tandem $T_{21}$ remains connected with PSAP $P_2$, but is not connected with central offices $CO_{21}$, $CO_{22}$. Similarly, tandem $T_{22}$ remains connected with PSAP $P_2$, but is not connected with central offices $CO_{221}$, $CO_{222}$. Tandem $T_3$ remains connected with PSAP $P_3$, but is not connected with central office $CO_3$. In state 108, tandem $T_5$ remains connected with PSAP $P_5$, but is not connected with central offices $CO_{51}$, $CO_{52}$, not connected with wireless service provider $WSP_5$, and not connected with Internet service provider $ISP_5$.

In fact, direct connections between tandems and PSAPs are not strictly required by the present invention; all connections with tandems may be effected via a public switched telephone network (PSTN), such as network 114 in FIG. 4. Direct connection with a service provider such as a central office, a wireless service provider or an Internet provider may be established, if desired. However, such direct connections are not required to advantageously employ the structure of the preferred embodiment of the present invention.

All tandems $T_1$, $T_{21}$, $T_{22}$, $T_3$, $T_4$, $T_5$ are connected with network 114. Connection with network 114 is the only connection that any tandem $T_1$, $T_{21}$, $T_{22}$, $T_3$, $T_4$, $T_5$ needs to have with any service provider, with any other tandem, or with any PSAP. Of importance is the fact that connection with network 114 effects connection between each tandem $T_1$, $T_{21}$, $T_{22}$, $T_3$, $T_4$, $T_5$ and any PSAP $P_1$, $P_2$, $P_3$, $P_4$, $P_5$ in state 100.

Providing each tandem $T_1$, $T_{21}$, $T_{22}$, $T_3$, $T_4$, $T_5$ with network switching and management capabilities, as by including selective call router 82, automatic call distributor 90, network manager device 78 and data manager device 80 (FIG. 2), ensures that each tandem $T_1$, $T_{21}$, $T_{22}$, $T_3$, $T_4$, $T_5$ can fully employ geographic information accompanying a call to effect routing of the call to the most proximate PSAP $P_1$, $P_2$, $P_3$, $P_4$, $P_5$ to the caller's locus for providing assistance. Further, the network connection simplifies such routing to a proximate PSAP whatever the communication milieu employed to convey the call; all of the calls eventually are conveyed over network 114 to a tandem $T_1$, $T_{21}$, $T_{22}$, $T_3$, $T_4$, $T_5$, and all calls for dispatching assistance are likewise conveyed over network 114.

The desired pairing of emergency service complexes (ESC) for redundancy in case of disaster can be easily established using known network design and planning techniques, thereby avoiding installation of expensive hard wiring to effect desired parallelism. Further, using network management techniques backup capabilities may be established "on the fly" in case both a primary and a backup ESC are incapacitated. No hard wiring among tandems is necessary to establish redundancy or robustness in the system. All that is required is rerouting of calls within network 114 to create redundancy and back up arrangements, a network management software exercise.

Reference has been made earlier to geographic information accompanying calls. Such geographic information may include routing information within a network identifying the portal at which the call entered the network. For Internet communications (voice or data), the local access number employed to initiate the Internet service may provide a geographic indication of a caller's locus. Global Positioning System (GPS) information, or some other multi-dimensional coordinate locating system, may be employed for locating callers using wireless or satellite communication means. Other sorts of geographic information may as well be employed in connection with practicing the present invention without departing from the spirit of the invention.

Figure 5:
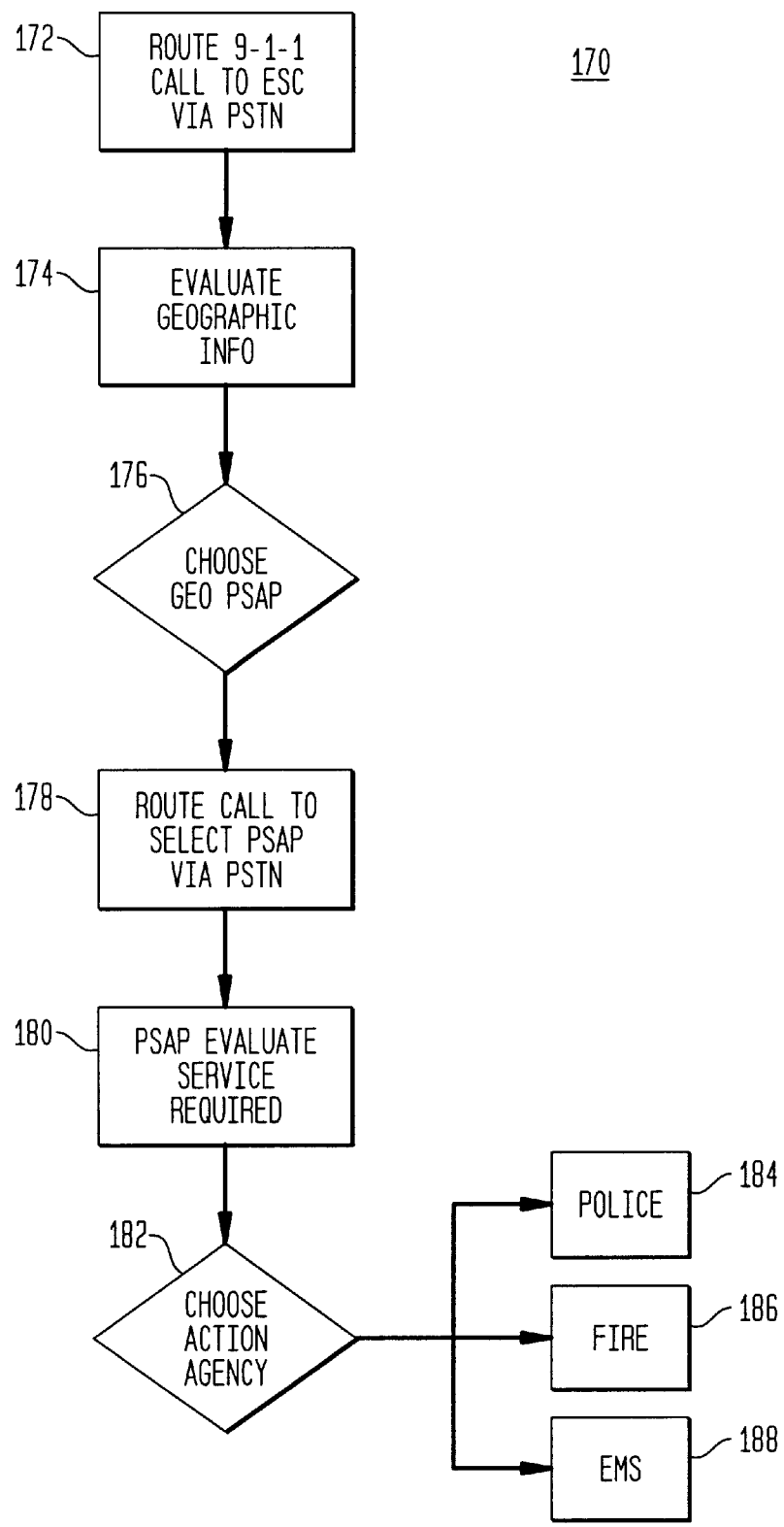
FIG. 5 is a schematic flow diagram illustrating the preferred embodiment of the method of the present invention, manifested in a 9-1-1 system.

FIG. 5 is a schematic flow diagram illustrating the preferred embodiment of the method of the present invention, manifested in a 9-1-1 system. In FIG. 5, the method is intended for use for handling abbreviated calls in a telecommunication network including an array of switches, junctions, communication channels, customer-operated communication devices and telecommunication service providing stations connected to facilitate electronic communication among a plurality of stations using a plurality of communication milieux (not shown in FIG. 5). The method 170 begins with the step of routing the abbreviated number call via the telecommunication network to an abbreviated number call processing center, as indicated by a block 172. The illustrative embodiment employed for explaining the invention in FIG. 5 is a 9-1-1 emergency services call in the United States. Thus, block 172 is labeled to indicate that the abbreviated number call is a 9-1-1 call routed to an emergency service complex (ESC) via a public switched telephone network (PSTN).

The method continues with evaluating geographic information received with the abbreviated number call to ascertain the locus of the caller originating the abbreviated number call, as indicated by a block 174. Such geographic information may indicate location of a switch or service provider (e.g., ILEC, ALEC, WSP, ISP) handling the abbreviated number call. The geographic information may be derived from Global Positioning System (GPS) information, or triangulated information from a plurality of wireless service towers to estimate position of a wireless caller, or any other geographic information appropriate to estimate the locus of the caller placing the abbreviated number call.

The method continues with selecting at least one abbreviated number call answering station (e.g., a public safety answering position—PSAP), as indicated by a block 176. The abbreviated number call is then routed to at least one abbreviated number call answering station, as indicated by a block 178. The at least one abbreviated number call answering station receiving the abbreviated call evaluates the content or nature of the call to ascertain the service required by the caller, as indicated by a block 180. Based upon the evaluation conducted according to block 180, the at least one abbreviated number call answering station chooses an abbreviated number action agency for response to the abbreviated number call, as indicated by a block 182. The selected action agency is notified of the action required by the abbreviated number call, as representatively indicated by a block 184 (in which case the response required may be provided by a police agency), a block 186 (in which case the response required may be provided by a fire agency), and a block 188 (in which case the response required may be provided by an emergency medical service agency).

A further step of the method, not shown in FIG. 5, may involve actually routing the abbreviated number call to the action agency for handling directly with the caller. Even further, the abbreviated number call may be routed to the responding unit dispatched by the action agency to the scene, such as a police patrol car or an ambulance.

It is desirable to be able to provide additional, or supplemental information beyond merely providing a caller's phone number and street address to a special number answering station, such as a public safety answering station (PSAP) in an emergency services system. In an emergency services system, for example, useful supplemental information may include language requirements, handicapped person status, oxygen tanks on premises, blood type or other special medical information, or other details of interest to emergency service personnel responding to calls. It is advantageous for such supplemental information to be provided to a PSAP coincident with the routing of an emergency service 9-1-1 voice call to the PSAP for action and response.

It is also desirable that additional notification be possible for special number call systems, such as emergency service systems. For example, it may be desirable for one to receive notification that a 9-1-1-call has been placed from a particular residence. Further, notification may be advantageously sent to a destination medical facility for emergency service personnel responding to a service request. Such a notification may advantageously include some of the supplemental information described above. In such manner, a medical facility may be forewarned of special circumstances involving a patient who is expected to arrive soon.

Earlier architectures to provide expanded notification capabilities for emergency service systems have contemplated establishing a private network for effecting the desired additional notifications. Such an approach is disclosed in U.S. Pat. No. 5,805,670 issued Sep. 8, 1998, to Pons, et al, for "Private Notification System for Communicating 9-1-1 Information". While such private networks accomplish notification, they are expensive to install, require separate maintenance and sometimes require special maintenance.

It would be advantageous to provide a system for providing supplemental data, or information, in a special number system, such as a 9-1-1 emergency service system, that exists within existing public switched telephone networks (PSTNs). In this context, the PSTN is regarded as including any publicly accessible phone network, including wireless service networks, Internet service providers (ISPs), satellite telephone networks, paging networks and the like.

Thus, the protocol by which a PSAP and a telephone central office operate and cooperate for emergency service calls is configured to enable queries directly from a PSAP to a notification database or a supplemental information database resident in the PSTN. Similar improvements to the system operating protocol enable updates to be made to the databases by the PSAP. One embodiment of the present invention provides that expanded service may be subscribed to by customers in order to receive additional notification. For example, a customer may subscribe to the expanded service to be notified whenever a 9-1-1 call is placed from his home. Notification may be effected to a cellular phone, an office phone, a pager, an Internet address, or another receiving station, or a combination of receiving stations.

Maintaining supplemental information and notification information in separate databases from operational PSTN equipment serves to avoid unnecessary loading of operational equipment that may otherwise slow routine operations.

Thus, a notification bridge, or other communication junction device, may be located in a licensed exchange carrier's (LEC's), or other telecommunication service provider's, automatic location identification (ALI) system to operate as a gateway between a public service answering station (PSAP) and the notification database and supplemental information database (the additional data bases) in order to exchange data between the PSAP and one or both of the additional data bases. The additional databases may be located at a different site than the telecommunication service provider, such as at a notification facility. The invention is preferably embodied in a new two-way end-to-end emergency service supplemental data and notification (ESSDN) protocol between a computer aided dispatch system at a PSAP and one or both of the additional data bases, preferably situated in association with a notification bridge arrangement. The present invention effects communications between the computer aided dispatch system (preferably at the PSAP) and the notification bridge (preferably in the Automatic Location Indication (ALI) system at the telecommunication service provider), and effects communications between the notification bridge and one or both of the additional data bases.

This system arrangement embodying the present invention provides advantages. During the processing of an ALI query from the PSAP, the ALI system may determine that the request has supplemental data associated with it. In such a case, the notification bridge poses a query to the communication bridge, or other communication junction device, which passes it to the notification database at a notification facility. Notification may be effected by paging, call center activity, cellular phone, wireline phone, Internet communications, satellite communications or another telecommunication milieux.

Supplemental data is returned from the notification database to the PSAP through the communication bridge via the PSTN to the notification bridge in the ALI system. The ALI system then passes the information to the computer aided dispatch system (at the PSAP) on the existing ALI link to the PSAP. Depending upon details of the implementation of the system, the response by the ALI system to an ALI query from the PSAP may be suspended until the supplemental data is retrieved. Alternatively, an initial ALI response may be sent to the PSAP immediately and the supplemental data sent at a later time when it is received from the notification database.

The computer aided dispatch system may make a request for supplemental data. An example of this is a manual request by a call taker to get supplemental data for a current or previous emergency service caller. In the case of a manual request the computer aided dispatch system may pass the request with appropriate parameters to the notification bridge in the ALI system. The notification bridge will recognize the request and forward it to an appropriate notification database, if there is more than one notification database. The notification database returns the supplemental data to the notification bridge in the ALI system. The ALI system passes the information to the computer aided dispatch subsystem at the PSAP.

The computer aided dispatch subsystem may request that the supplemental data be forwarded to another agency. This may occur simultaneously with the transfer of the voice call or independent from any voice call. The request for forwarding will be sent, along with the supplemental data to be forwarded, from the computer aided dispatch subsystem to the notification bridge subsystem. The notification bridge subsystem will preferably have intelligence regarding where to transfer the information, or it will query the notification database for the required transfer information.

The invention is exercised as a two-way end-to-end query/response message base protocol between the computer aided dispatch subsystem_(preferably at the PSAP) and the notification database subsystem, traversing the notification bridge subsystem in the ALI system. The invention passes requests from the PSAP to the notification database. The notification database contains emergency care information and notification information regarding a subscriber to the service. The PSAP will query for this information by sending, at a minimum, the telephone number and PSAP position requesting the information. The notification database will return the subscriber information in a form to be displayed or printed (or both) at the PSAP.

Figure 6:
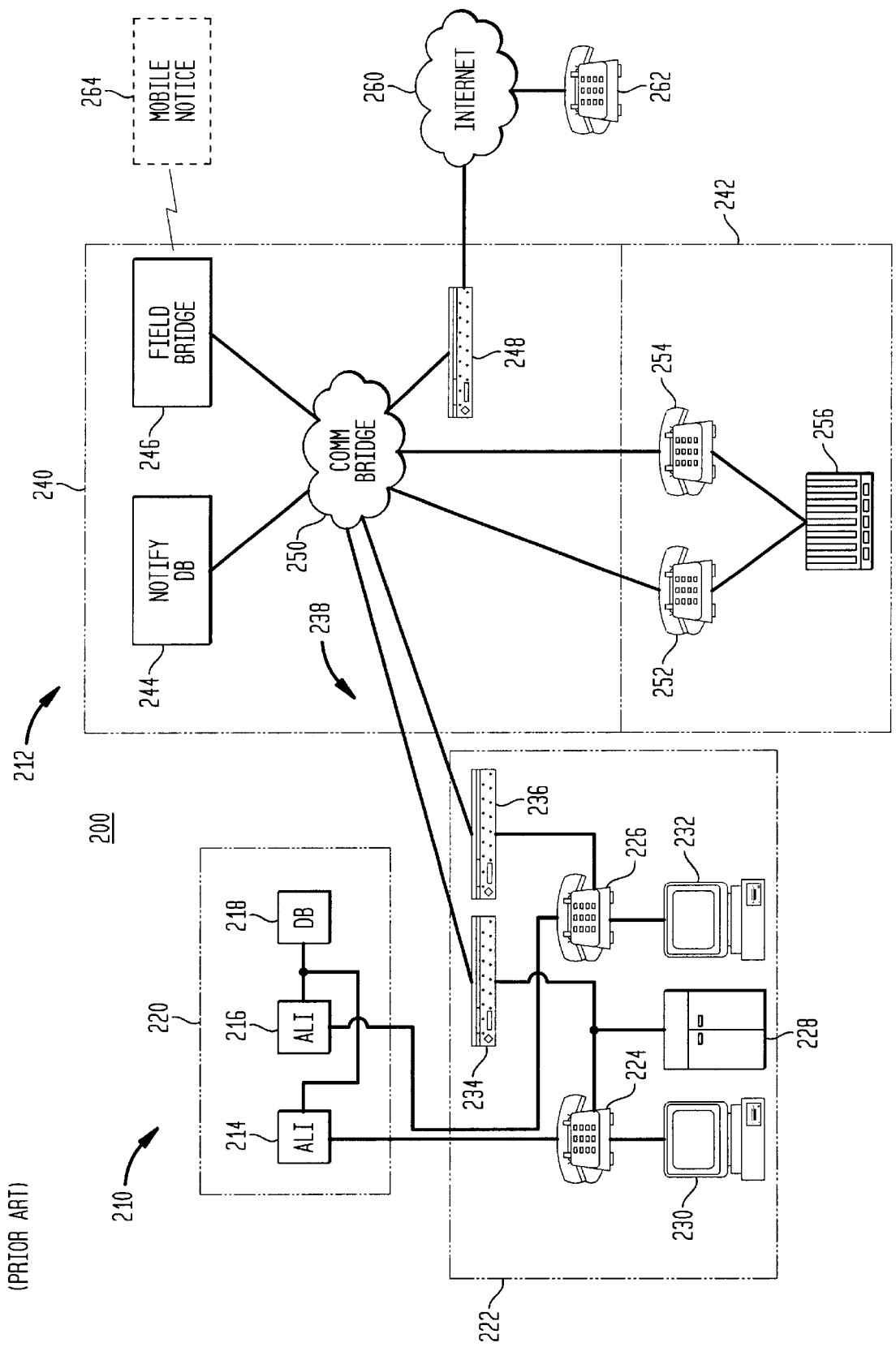
FIG. 6 is a schematic block diagram of a prior art system for providing emergency service communication in a telecommunication network.

FIG. 6 is a schematic block diagram of a prior art system for providing emergency service communication in a telecommunication network. In FIG. 6, an emergency service system 200 includes an automatic location information (ALI) system 210 and a notification system 212. ALI system 210 includes at least one ALI manager unit 214, 216 and an ALI Database 218 located at a telecommunication service provider 220. More than one ALI database may be employed. ALI system 210 also includes a public safety answering position (PSAP) 222. PSAP 222 includes at least one call taker station 224, 226. Call taker stations 224, 226 are connected with ALI manager units 214, 216, and are also connected with a common server 228 and computer workstations 230, 232. Further included in PSAP 222 are communication junctions 234, 236. Communication junctions 234, 236 are appropriate communication interface devices to effect communication with a private communication network 238 establishing communications between PSAP 222 and notification system 212. Communication junctions 234, 236 may be such devices as routers, modems, or other appropriate devices to establish and maintain communications through private communication network 238.

Notification system 212 includes a notification data center 240 and a notification interface center 242. Notification data center 240 includes a notification database 244, a field bridge 246 and a communication junction device 248. Notification database 244, field bridge 246 and communication junction device 248 are in communicative connection via a communication bridge 250.

Notification interface center 242 includes at least one call taker station 252, 254. Call taker stations 252, 254 are connected with an automatic call distributor device 256. Call taker stations 253, 254 are also connected with communication bridge 250 and, therefore, are communicatively connected with notification database 244, field bridge 246 and communication junction device 248. Private communication network 238 is also connected with communication bridge 250. Thus, private network 238 communicatively connects PSAP 222 with all elements of notification system 212 via communication bridge 250.

Communication junction device 248 is configured for providing communication interface with Internet communication networks or facilities, for example via Internet 260 with an end user/subscriber 262. Field bridge 246 is configured for providing notice to wireless notice recipients 264 using wireless technologies such as pagers, cellular phones, satellite phones, wireless Internet communications, or other wireless communication protocols.

Call taker stations 252, 254 are inbound/outbound communication contact points for notification system 212. As inbound communication contact points, call taker stations 252, 254 receive calls from subscribers who are calling notification system 212 in response to a 9-1-1 notification event. Another function of call taker stations 252, 254 acting as inbound communication contact points may be to receive administrative calls from subscribers and from others seeking to subscribe. Administrative details, such as altering instructions regarding circumstances under which notification is to be effected, are fielded by call taker stations 252, 254. As outbound communication contact points, call taker stations 252, 254 may be employed for calling a subscriber-identified phone number or a call list to be notified in case of a 9-1-1 notification event. During slack periods, call taker stations 252, 254 may be employed to solicit new subscribers for notification system 212.

In operation, emergency service system 200 may receive a 9-1-1 call that is routed to PSAP 222 (routing is not shown in FIG. 6). A call taker station 224, 226 receives caller-related information from an automatic location indicator (ALI) manager unit 214, 216 working in conjunction with ALI database 218. Included in the information provided to call taker station 224, 226 is an indication that supplemental information is available for the caller presently engaged with PSAP 222. That is, ALI manager unit 214, 216 identifies the extant caller as a subscriber for expanded information service, or for 9-1-1 notification service or for both services. In prior art emergency service system 200 of FIG. 6, PSAP call taker station 224, 226 communicates with notification system 212 via a communication junction 234, 236, private communication network 238 and communication bridge 250 to receive supplemental information and, if applicable, to advise notification system 212 that a notification subscriber is on line. Notification system 212 will pick appropriate supplemental information from notification database 244 and pass the information to PSAP 222 via communication bridge 250 and private communication network 238. If the caller is a notification service subscriber, notification system 212 will also pick appropriate notification information from notification database 244 and, via communication bridge 250, effect notification using a communication milieu as directed by the subscriber—either wirelessly via field bridge 246, via the Internet through communication junction device 248, or via wireline phone through a call taker station 252, 254 and automatic call distributor 256. Notification arrangements with the calling subscriber may involve more than one milieu for notification.

Figure 7:
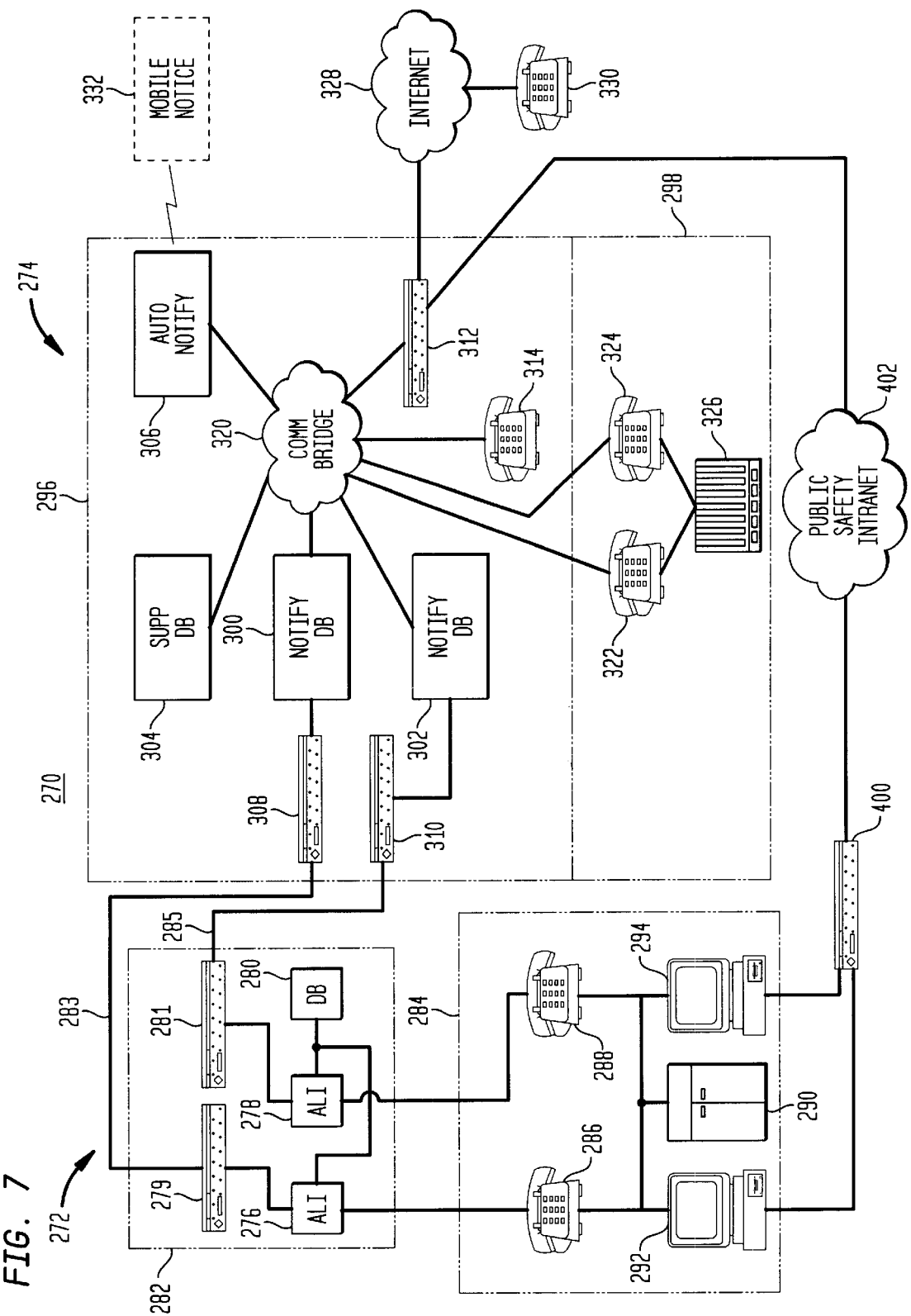
FIG. 7 is a schematic block diagram of the preferred embodiment of a system for providing emergency service communication in a telecommunication network.

FIG. 7 is a schematic block diagram of the preferred embodiment of a system for providing emergency service communication in a telecommunication network. In FIG. 7, an emergency service system 270 includes an emergency service request acquisition subsystem 272 and a notification facility 274.

Acquisition subsystem 272 includes at least one ALI manager unit 276, 278 and an ALI Database 280 located at a telecommunication service provider 282. More than one ALI database may be employed. Telecommunication service provider 282 also includes at least one communication junction device 279, 281. Communication junction devices 279, 281 are appropriate communication interface devices to effect communication via the public switched telephone network (PSTN), represented in FIG. 7 by network connections 283, 285. Thus, emergency service acquisition subsystem 272 establishes communications with notification facility 274 using communication junction devices 279, 281 and the PSTN. In this context, the PSTN is regarded as including any publicly accessible phone network, including wireless service networks, Internet service providers (ISPs), satellite telephone networks, paging networks and the like. Communication junction devices 279, 281 may be such devices as routers, modems, or other appropriate devices to establish and maintain communications through the PSTN.

Acquisition subsystem 272 also includes a dispatch facility embodied in a public safety answering position (PSAP) 284. PSAP 284 includes at least one call taker station 286, 288. Call taker stations 286, 288 are connected with ALI manager units 276, 278, and are also connected with a common server 290 and computer workstations 292, 294.

Notification facility 274 includes a notification data center 296 and a notification interface center 298. Notification data center 296 includes at least one notification database 300, 302; at least one supplemental database 304; an automatic notification unit 306; at least one communication junction device 308, 310, 312; and an order entry call station 314. Notification databases 300, 302; supplemental database 304; automatic notification unit 306; communication junction device 312; and order entry call station 314 are in communicative connection via a communication bridge 320.

Communication junction devices 308, 310 are appropriate communication interface devices to effect communication via the public switched telephone network (PSTN), represented in FIG. 7 by network connections 283, 285. Thus, communication junction devices 308, 310 participate in the establishment of communications between notification facility 274 and emergency service acquisition subsystem 272 using communication junction devices 279, 281 and the PSTN. Communication junction devices 308, 310 may be such devices as routers, modems, or other appropriate devices to establish and maintain communications through the PSTN.

Communication junction devices 308, 310 are illustrated in FIG. 7 as being connected with notification databases 300, 302. In an alternate embodiment of the apparatus of the present invention, communication junction devices 308, 310 may be connected with communication bridge 320. Using such an alternate arrangement, ALI manager units 276, 278 and their associated ALI database 280 are in communication with notification databases 300, 302; supplemental database 304; automatic notification unit 306; communication junction device 312; and order entry call station 314 via the PSTN and communication bridge 320 using communication junction devices 279, 281, 308, 310.

Notification interface center 298 includes at least one call taker station 322, 324. Call taker stations 322, 324 are connected with an automatic call distributor device 326. Call taker stations 322, 324 are also connected with communication bridge 320 and, therefore, are communicatively connected with notification databases 300, 302; supplemental database 304; automatic notification unit 306; communication junction device 312; and order entry call station 314. Call taker stations 322, 324 may also be in communication with emergency service request acquisition subsystem 272 when using the alternate embodiment described above by which communication junction devices 308, 310 are connected with communication bridge 320.

Communication junction device 312 is configured for providing communication interface with Internet communication networks or facilities, for example via Internet 328 with an end user/subscriber 330. Automatic notification unit 306 is configured for providing notice to wireless notice recipients 332 using wireless technologies such as pagers, cellular phones, satellite phones, wireless Internet communications, or other wireless communication protocols.

Call taker stations 322, 324 are inbound/outbound communication contact points for notification facility 274. As inbound communication contact points, call taker stations 322, 324 receive calls from subscribers who are calling notification facility 274 in response to a 9-1-1 notification event. Another function of call taker stations 322, 324 acting as inbound communication contact points may be to receive administrative calls from subscribers and from others seeking to subscribe. Administrative details, such as altering instructions regarding circumstances under which notification is to be effected, are fielded by call taker 322, 324. Order entry call station 314 may perform similar incoming communication contact point functions, especially when call taker stations 322, 324 are busy with outbound communication contact point functions. As outbound communication contact points, call taker stations 322, 324 may be employed for calling a subscriber-identified phone number or a call list to be notified in case of a 9-1-1 notification event.

In operation, emergency service system 270 may receive a 9-1-1 call that is routed to PSAP 284 (routing is not shown in FIG. 7). A call taker station 286, 288 receives caller-related information from an automatic location indicator (ALI) manager unit 276, 278 working in conjunction with ALI database 280. Included in the information provided to call taker station 286, 288 is an indication that supplemental information is available for the caller presently engaged with PSAP 284. That is, ALI manager unit 276, 278 identifies the extant caller as a subscriber for expanded information service, or for 9-1-1 notification service or for both services. PSAP call taker station 286, 288 communicates with notification facility 274 via phone connections with telecommunication service provider 282. That is, call taker station 276, 278 communicates via the PSTN using communication junction devices 279, 281, 308, 310 to receive supplemental information and, if applicable, to advise notification facility 274 that a notification subscriber is on line. Notification facility 274 will pick appropriate supplemental information from notification database 300, 302 or supplemental database 304 and pass the information via communication junction devices 308, 310, 279, 281 and the PSTN to telecommunication service provider 282 for further transfer to PSAP 284. If the caller is a notification service subscriber, notification facility 274 will also pick appropriate notification information from notification database 300, 302 or supplemental database 304 and, via communication bridge 320, effect notification using a communication milieu as directed by the subscriber—either wirelessly via automatic notification unit 306, via the Internet through communication junction device 312, or via wireline phone through a call taker station 322, 324 and automatic call distributor 326. Notification arrangements with the calling subscriber may involve more than one milieu for notification.

PSAP call taker station 286, 288 may also communicate with notification facility 274 via a router 400 connecting with a public service intranet 402. Public service intranet 402 may be connected with communication bridge 320 via communication junction device 312, or via another dedicated communication junction device (not shown in FIG. 7). Public service intranet 402 affords additional communications capability to call taker stations 286, 288. Such additional communication capability may be used advantageously, for example, for after-call activities, such as data transfer relating to the hospital to which a person has been taken for treatment, or to convey similar information.

Figure 8:
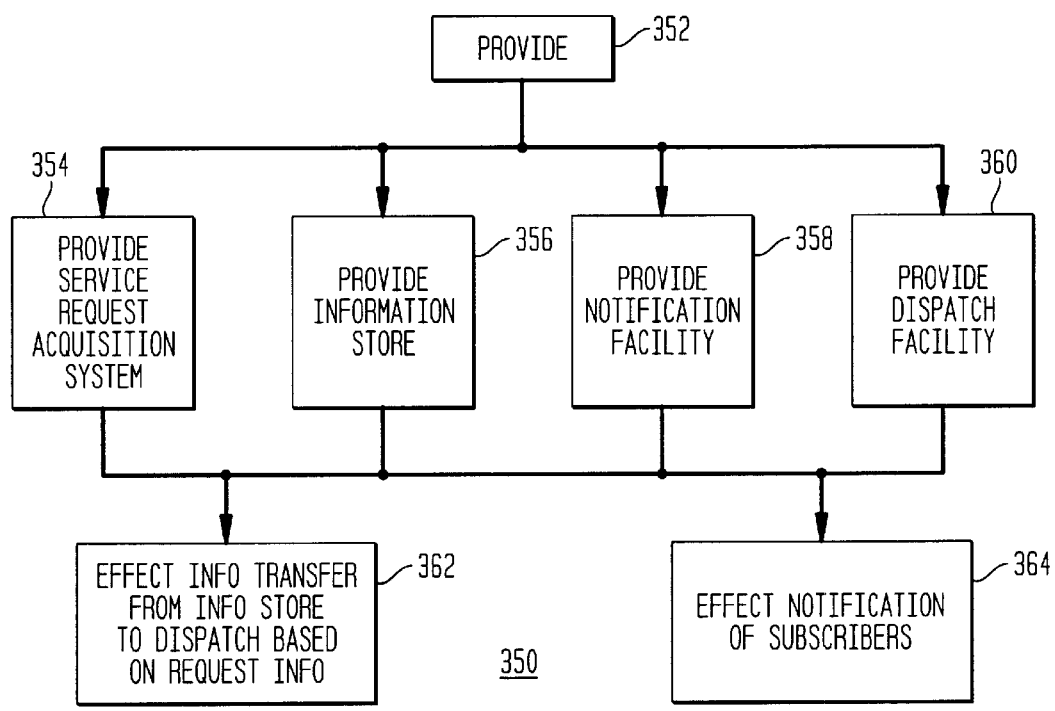
FIG. 8 is a schematic block diagram illustrating the preferred embodiment of the method of the present invention.

FIG. 8 is a schematic block diagram illustrating the preferred embodiment of the method of the present invention. In FIG. 8, the method is intended for use in providing expanded emergency service communication in a telecommunication network including an array of switches, junctions, communication channels, user-operated communication devices and telecommunication service providing stations connected to facilitate electronic communication among a plurality of stations using a plurality of communication milieux (not shown in FIG. 8). The method 350 begins with the step of providing, in no particular order, as indicated by a block 352:

1. A service request acquisition subsystem for receiving emergency service requests from a requesting a caller via at least one of the user-operated communication devices, as indicated by a block 354. An example of such a service request acquisition subsystem is emergency service request acquisition subsystem 272 (FIG. 7).

2. An information store for storing pertinent information relating to selected of the requesting callers, as indicated by a block 356. An example of such an information store is supplemental data base 304 (FIG. 7). Pertinent information includes expanded emergency service information relating to callers who have subscribed to the service contemplated as being provided pursuant to the practice of the method of the invention.

3. A notification facility for storing information relating to arrangements for notifying selected expanded service subscribers pursuant to predetermined criteria, as indicated by a block 358. An example of such a notification facility is notification facility 274 (FIG. 7). Predetermined criteria may be established by subscribers to the service contemplated as being provided pursuant to the practice of the method of the invention, such as under what circumstances a subscriber wishes to be notified of a 9-1-1 event.

4. A dispatch facility for receiving at least some of the pertinent information relating to affected requesting callers associated with an extant emergency service request, as indicated by a block 360.

The method continues with the step of effecting transfer of at least some of the pertinent information to the dispatch facility based upon emergency request information acquired by the acquisition subsystem relating to the extant emergency service request, as indicated by a block 362. For example information in ALI database 280 (FIG. 7) may be flagged for callers who have subscribed to an expanded information service, or to a notification service or to both services. Such flagged records will alert a call taker station 286, 288 at PSAP 284 to request expanded information from notification facility 274 via telecommunication service provider 282 using the PSTN, all as described in detail in connection with FIG. 7.

The method may include the additional step of effecting notification of selected expanded services subscribers based upon emergency service request information relating to the extant emergency service request, as indicated by a block 364. It is not required that the steps represented by blocks 362, 364 be performed in any particular order, nor is it required that both steps be performed. That is, subscribers may subscribe to one service (expanded information and notification) or they may subscribe to only one service. Further, for subscribers who subscribe to both services, the method does not require that one of the services be rendered before the other service; the provision of the two services—expanded information and notification—are independent of each other.

Current implementations of enhanced automatic location indication (ALI) information systems are confined to specific emergency response agencies or local exchange carriers (LECs). As wireless telephone units and traffic increase as a proportion of total phone sets in use, both in North America and around the world, the need for tracking and transmission of enhanced ALI information by wireless users will also increase. Enhanced ALI information includes such information as medical condition, doctor contacts, treatment requirements, emergency contacts, travel schedule and other information.

What is needed is a globally accessible enhanced ALI database available to all public safety answering positions (PSAPs) accessing information stored by various wireless carriers or third-party enhanced ALI service providers, such as airlines or travel/auto clubs. The required database may be implemented in a variety of physical configurations depending upon the required capacity of a specific system, geographic coverage relative to transport needs and costs, proportions of local queries versus long distance queries to the database, and redundancy and reliability requirements. It is useful to have enhanced ALI information available regarding both the individual placing a call as well as regarding contact parties to be notified.

A useful implementation for enhanced ALI information handling involves interaction between specifically equipped call handling equipment that directs the enhanced ALI information to more narrowly defined data fields in computer/telephony interface call handling equipment rather than providing all information in a long string text variable. Such data manipulation enables call handling equipment to present the information to a call taker in a more useful format as well as enables launching of various program sub-routines in response to the information. Examples include programming a button with a listed doctor's or other contact's telephone number, accessing emergency response protocol information based on medical condition, or other data handling and display arrangements.

Because multiple parties with varying enhanced ALI information could make use of a single telephone, and because information is stored by telephone number, it is useful to provide a system that accommodates personal identification devices that would electronically, and without direct physical contact, identify a caller to the telephone device/terminal equipment being used to access the emergency services call system. Telephones or terminal devices may be configured to relay personal identification information to an enhanced ALI system for relay to the PSAP. Such personal identification devices are preferably small—on the order of the size of a personal medallion—with a transmit range of a few feet to a receiving device in a telephone or other terminal equipment. The terminal equipment receives the signal, decodes the signal to an identification code to be transmitted with the dialed digits to the emergency services complex (ESC). At the ESC the call may be analyzed and routed to the appropriate PSAP with appropriate enhanced ALI information attached. Voice print technology may also be advantageously employed in effecting personal identification for use with the invention. Such an improved system for providing enhanced ALI information has the advantage of accommodating wireless callers to the emergency services call system, in addition to the wireline callers served by earlier systems.

In contemporary emergency service call systems, emergency callers speaking a non-official language are placed on hold by a call taker in the public safety answering position (PSAP). The call taker then carries out several steps to dial a translation center, to provide the PSAP's identification number to the translation center, and to execute a conference call to connect the emergency caller with the translation center. There is a need for a simpler, more efficient way to bring an emergency services caller in contact with a translator for handling calls in a non-official language. For purposes of this application, an official language is a language for which an emergency services call facility (such as a PSAP) regularly staffs for translation. A non-official language is a language for which there is not regular staffing at the PSAP, but for which a translator may be made available by phone. An improved system for bringing an emergency caller in contact with a translator contemplates providing a one-button (or otherwise easily activated) bridged connection to a translation center, the emergency services caller, the PSAP call taker, and the action agency responding to the extant emergency. The improved system further provides automatic transmission of the PSAP's identification number to the translation center.

The improved system may be embodied partly in the emergency response telephony network, partly in call centers/PSAPs and partly at the translation center. By way of example, the emergency response telephony network provides the bridging components and capability. The call centers/PSAPs provide a computer-telephone interface (CTI) one-button "click" capability to set up the required communication bridge. Similarly simple CTI commands may be established to retrieve enhanced ALI information based upon the phone number of the emergency service caller that indicates the presence of a non-official language speaker. The translation center provides a CTI interface to retrieve the PSAP's identification number. An alternative to sending the PSAP's identification number as part of the voice link is to send the information on a data link triggered by the PSAP's voice bridging set-up event.

Such an improved bridging system would find usefulness in other aspects of PSAP operations. It provides added speed in connecting concerned parties, such as a caller and a translator. Such bridging arrangements also reduce the risk of disconnected calls in place of the conferencing approach now employed. Still further, by providing a bridge, the PSAP call taker has the flexibility to exit the call if necessary. Conferencing requires the conferencing party (i.e., the PSAP call taker, in this situation) to remain connected in order to keep the call connected. It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A system for providing expanded emergency service communication in a telecommunication network; said telecommunication network including a plurality of junctions connected by a plurality of communication channels, a plurality of telecommunication service providing stations connected into said plurality of communication channels at at least one of said for effecting a plurality of various telecommunication milieux for communication among at least one telecommunication services providing station of said plurality of telecommunication service providing stations, at least one emergency service complex, at least one emergency service answering position, and at least one expanded service subscriber; the system comprising:

(a) a service request acquisition subsystem;
    (b) an information store;
    (c) a notification facility; and
    (d) a dispatch facility;
    said service request acquisition subsystem, said information store, said notification facility and said dispatch facility being distributed among said telecommunication network; the system effecting transfer of pertinent information from said information store to said dispatch facility based upon emergency request information acquired by said acquisition subsystem; said transfer being effected via a public switched telephone network; the system effecting notification of selected expanded service subscribers of said at least one expanded service subscriber based upon said emergency request information.

2. A system for providing expanded emergency service communication in a telecommunication network as recited in claim 1 wherein said plurality of various telecommunication milieux includes Internet communications.

3. A system for providing expanded emergency service communication in a telecommunication network as recited in claim 1 or 2 wherein said plurality of various telecommunication milieux includes wireless communications.

4. A system for providing expanded emergency service communication in a telecommunication network; said telecommunication network including an array of switches, junctions, communication channels, user-operated communication devices and telecommunication service providing stations connected to facilitate electronic communication among a plurality of stations using a plurality of communication milieux for communication among at least one said telecommunication service providing station, at least one emergency service complex, at least one emergency service answering position, and at least one expanded service subscriber; the system comprising:

(a) a service request acquisition subsystem; said service request acquisition subsystem receiving emergency service requests from a requesting caller via at least one of said customer-operated communication devices;
    (b) an information store; said information store storing pertinent information relating to selected said requesting callers;
    (c) a notification facility; said notification facility storing information relating to arrangements for notifying selected expanded service subscribers of said at least one expanded service subscriber pursuant to predetermined criteria; said pertinent information including at least some of said predetermined criteria; and
    (d) a dispatch facility; said dispatch facility receiving at least some selected information of said pertinent information relating to affected said requesting callers; said affected requesting callers being associated with an extant said emergency service request;
    said service request acquisition subsystem, said information store, said notification facility and said dispatch facility being distributed among said telecommunication network; the system effecting transfer of at least some selected information from said information store to said dispatch facility based upon emergency request information acquired by said acquisition subsystem relating to said extant emergency service request; said transfer being effected via a public switched telephone network; the system effecting notification of selected expanded service subscribers of said at least one expanded service subscriber based upon said emergency request information relating to said extant emergency service request.

5. A system for providing expanded emergency service communication in a telecommunication network as recited in claim 4 wherein said plurality of various telecommunication milieux includes Internet communications.

6. A system for providing expanded emergency service communication in a telecommunication network as recited in claim 4 or 5 wherein said plurality of various telecommunication milieux includes wireless communications.

7. A method for providing expanded emergency service communication in a telecommunication network; said telecommunication network including an array of switches, junctions, communication channels, user-operated communication devices and telecommunication service providing stations connected to facilitate electronic communication among a plurality of stations using a plurality of communication milieux for communication among at least one said telecommunication service providing station, at least one emergency service complex, at least one emergency service answering position, and at least one expanded service subscriber; the method comprising the steps of:

(a) providing, in no particular order:

(1) a service request acquisition subsystem for receiving emergency service requests from a requesting caller via at least one of said user-operated communication devices;

(2) an information store for storing pertinent information relating to selected said requesting callers;

(3) a notification facility for storing information relating to arrangements for notifying selected expanded service subscribers of said at least one expanded service subscriber pursuant to predetermined criteria; said pertinent information including at least some of said predetermined criteria; and (4) a dispatch facility for receiving at least some selected information of said pertinent information relating to affected said requesting callers; said affected requesting callers being associated with an extant said emergency service request; and (b) effecting transfer of at least some selected information via a public switched telephone network from said information store to said dispatch facility based upon emergency request information acquired by said acquisition subsystem relating to said extant emergency service request.

8. A method for handling an special number call placed by a caller in a telecommunication network as recited in claim 7 wherein the method comprises the further step of:

(c) effecting notification of selected expanded service subscribers of said at least one expanded service subscriber based upon said emergency request information relating to said extant emergency service request.

* * * * *